United States Patent [19]
Young

[11] Patent Number: 5,263,654
[45] Date of Patent: Nov. 23, 1993

[54] PALLET SHREDDING APPARATUS

[75] Inventor: Michael J. Young, Cedarburg, Wis.

[73] Assignee: Blower Application Co. Inc., Germantown, Wis.

[21] Appl. No.: 970,817

[22] Filed: Nov. 3, 1992

[51] Int. Cl.⁵ ............................................. B02C 19/12
[52] U.S. Cl. ................................. 241/84.3; 241/265; 241/274; 241/283; 83/410.8
[58] Field of Search ....................... 241/274, 84.3, 264, 241/283, 265, 300.1, 199.1, 95, 171; 83/404.3, 410.7, 410.8, 408, 468.1, 943, 409.2, 703

[56] References Cited

U.S. PATENT DOCUMENTS

| 61,037 | 1/1867 | Badger | 241/84.3 |
|---|---|---|---|
| 3,223,334 | 12/1965 | Wuthrich | 241/84.3 |
| 4,348,923 | 9/1982 | Huston et al. | 83/23 |
| 4,436,012 | 3/1984 | Hochanadel | 83/703 |
| 4,651,610 | 3/1987 | Scwelling | 83/636 |
| 4,750,255 | 6/1988 | Hufnagel | 29/564.3 |
| 4,903,902 | 2/1990 | Hufnagel | 241/84 |
| 5,105,526 | 4/1992 | Dykstra et al. | 29/564.3 |

Primary Examiner—Mark Rosenbaum
Assistant Examiner—John M. Husar
Attorney, Agent, or Firm—Andrus, Sceales, Starke & Sawall

[57] ABSTRACT

A pallet shredding apparatus comprising an inclined chute having an open upper end to receive pallets to be shredded and having an open lower end. The chute is moved in a reciprocating path of travel by a hydraulic cylinder unit. A stop is connected to the chute and is spaced from the lower end of the chute in a position to be engaged by the projecting end of the pallet. A pair of fixed blades are mounted in spaced relation and are adapted to be engaged by the projecting end of the pallet as the chute is moved to thereby shred the lower projecting end of the pallet.

20 Claims, 4 Drawing Sheets

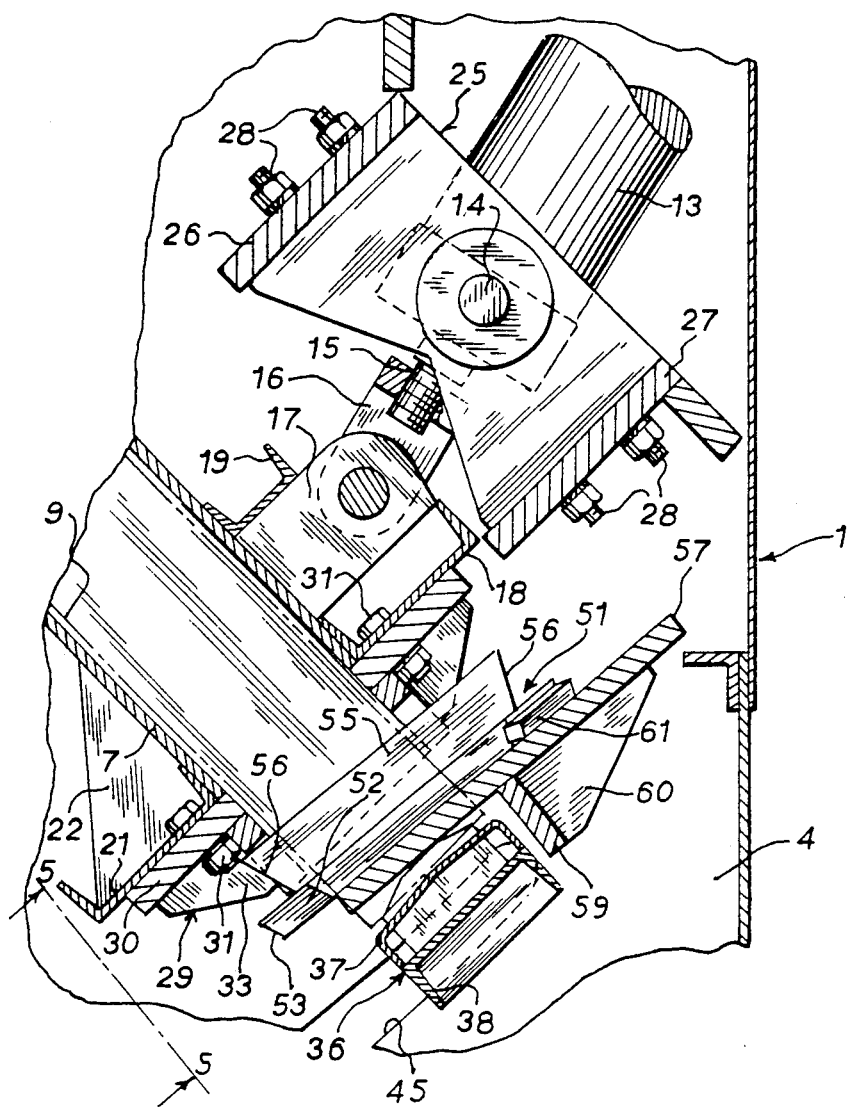
FIG. 2
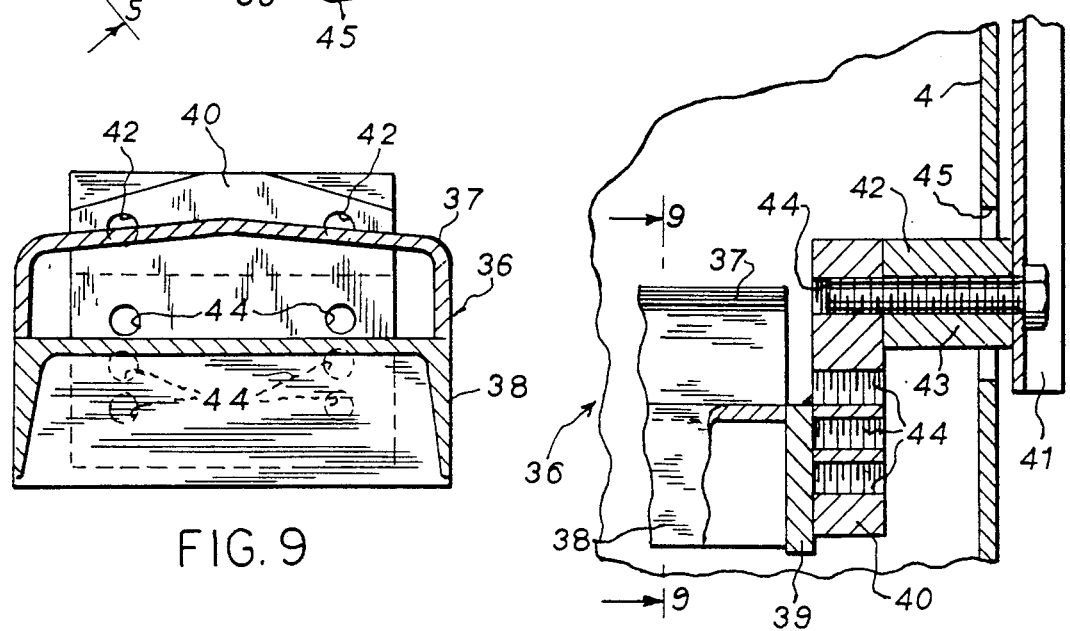
FIG. 9
FIG. 8

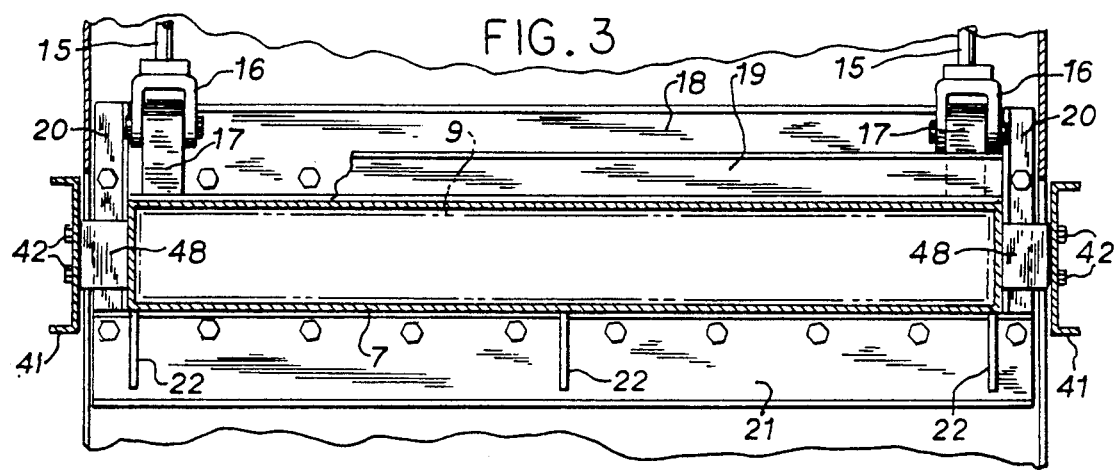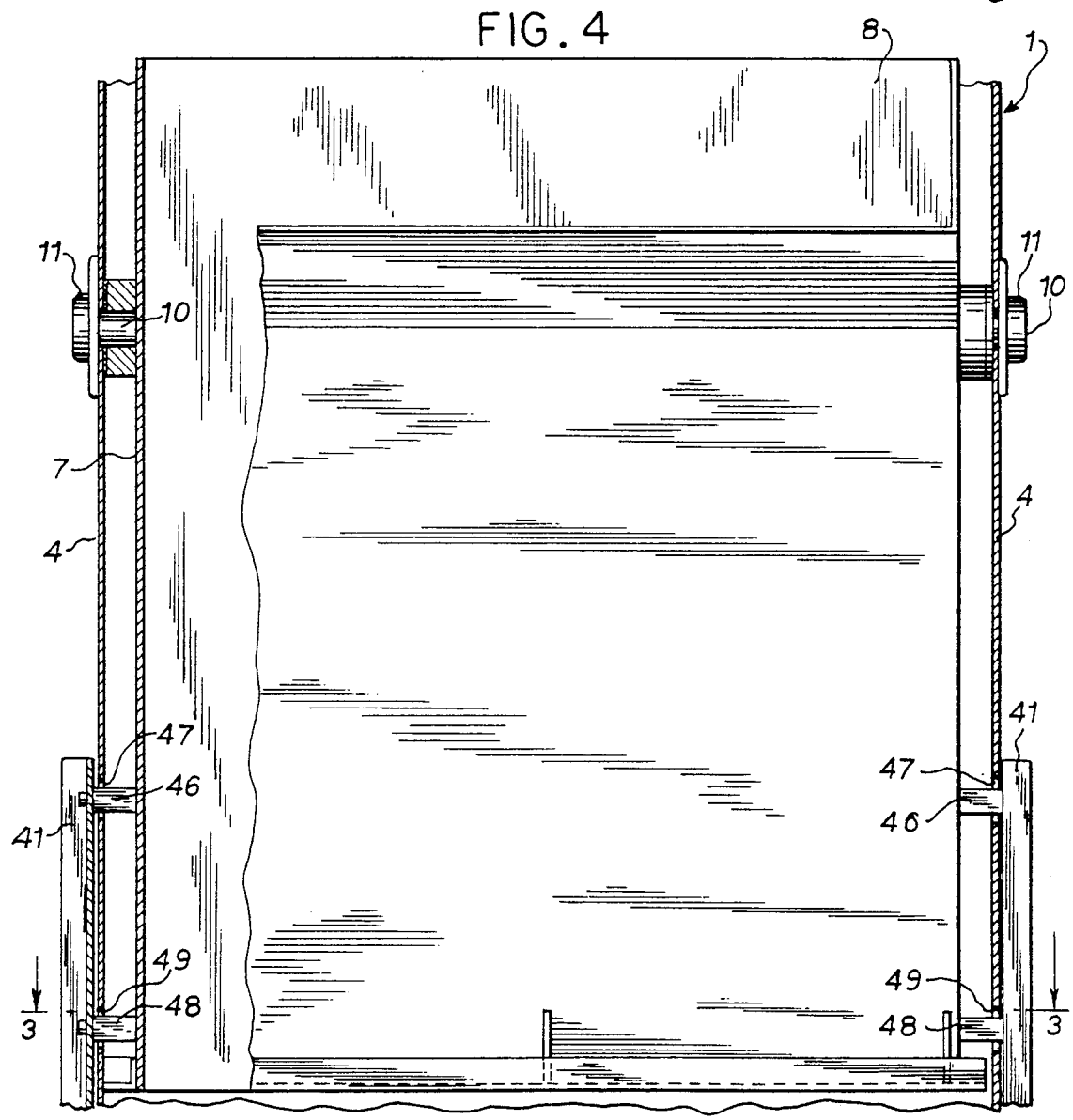

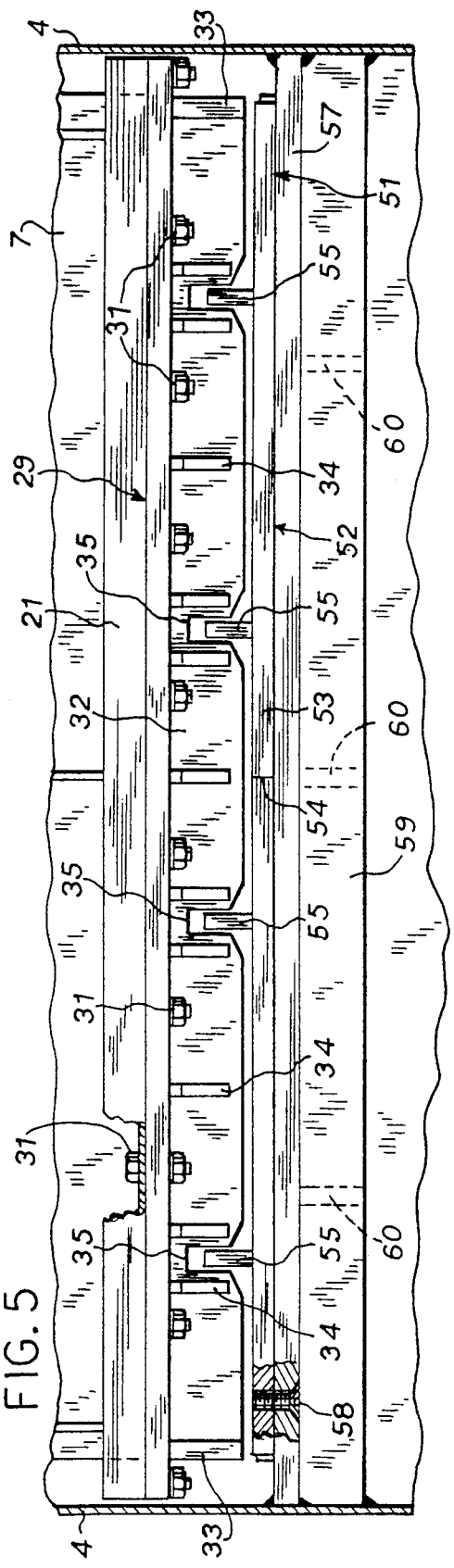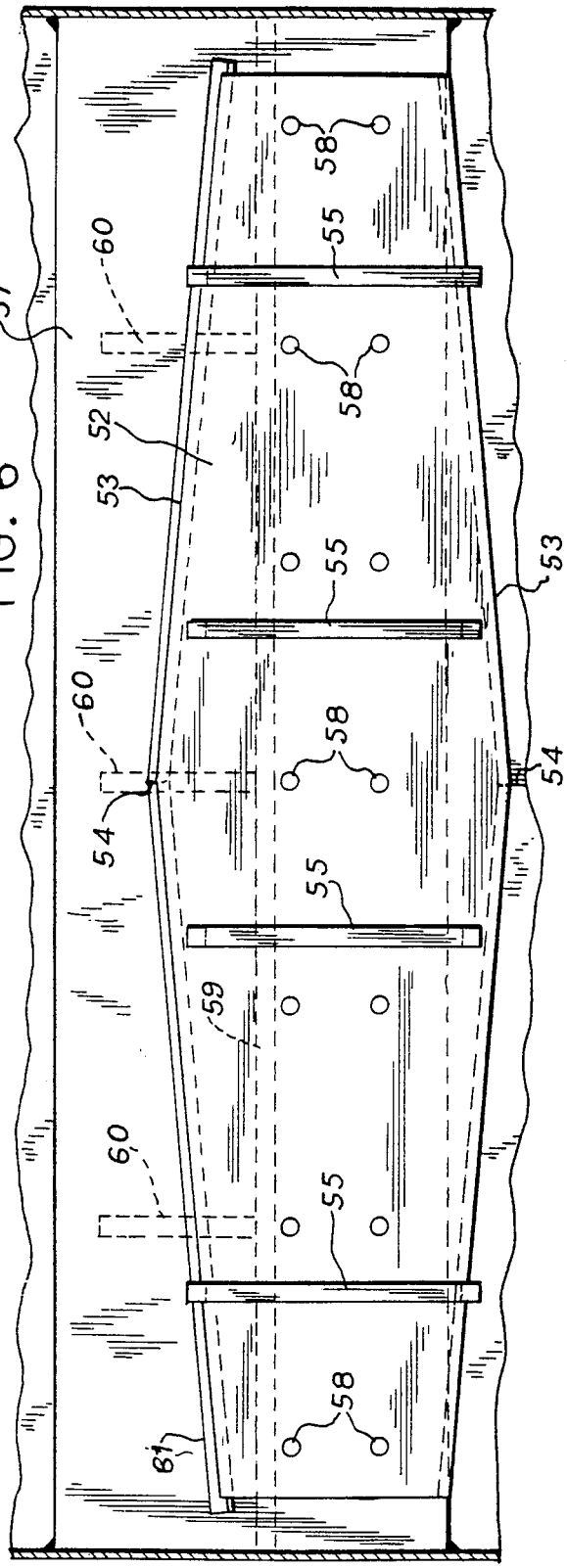

PALLET SHREDDING APPARATUS

BACKGROUND OF THE INVENTION

Wood pallets are used in factories and other industrial establishments to support equipment and supplies. Pallets are produced in different designs. Lightweight "one-way" pallets are designed to support lighter loads and are normally discarded after use, while others which are adapted to support heavier loads are produced with heavy hardwood stock and can be repaired and reused.

While some pallets are repaired and reused, most pallets are discarded, either because they are the "one-way" type, or the pallets may be damaged through usage, or the repairing cost is prohibitive. The disposal of wood pallets presents a serious environmental problem. Due to the size and structure of the pallets, they occupy considerable space and cannot be readily compacted by mechanical compactors. As waste disposal charges are dependent on the volume of the waste, and the number of trips to the landfill or disposal site there has been a need for equipment to shred or break up pallets so that they can be more readily compacted, thereby reducing the number of trips and correspondingly reducing the waste disposal charges.

In the past, large rotary shredders have been employed which utilize cooperating rollers with spikes or hooks which engage and rip the pallets apart. However, rotary shredders require large capital expenditures so that their use is only warranted by large companies that generate substantial quantities of pallets to be discarded. Thus, there has been a need for small, inexpensive pallet shredding apparatus to be used by companies that have lesser quantities of used pallets.

SUMMARY OF THE INVENTION

The invention is directed to an apparatus for shredding articles, such as wood pallets. In accordance with the invention, the apparatus comprises an outer housing or supporting structure, and a chute is mounted for oscillating movement within the housing The chute has an open upper end to receive a series of pallets in end-to-end relation and has an open lower end. The chute can be pivoted in the oscillatory path of travel by a hydraulic cylinder unit.

A pallet stop is connected through a pair of arms to the sides of the chute, and the pallet stop is spaced from the lower end of the chute in a position to be engaged by the projecting end of the lowermost pallet.

Mounted in fixed spaced relation to the housing are blade assemblies which are adapted to be engaged by the projecting end of the pallet as the chute is moved in its oscillating path. In addition, each blade assembly includes a shear blade, which is designed to shear off the projecting end of the pallet, and a series of spaced parallel splitter blades extend upwardly in spaced relation from the shear blade and are adapted to split the end of the pallet above the shear blade.

As the chute containing the pallet moves to one end of its oscillating stroke, the projecting end of the pallet will engage the shear blade and the splitter blades to thereby break away or shred the lower end of the pallet with the fragments falling downwardly in the area between the two blade assemblies to a collection site. As the chute moves in the return stroke, it engages the other fixed blade assembly, thereby shredding a second portion of the pallet. With this construction, shredding occurs on each stroke of movement of the chute.

As a feature of the invention, the pallet stop can be adjusted in position relative to the lower end of the chute to thereby adjust the depth of cut or shredding of the pallet.

The shredding apparatus of the invention can be mounted directly above a mechanical compactor so that the shredded fragments of the pallet are deposited directly into the compactor.

The shredded fragments have a size of generally less than about 18 inches so that they can be readily compacted by a mechanical compactor, thereby reducing the overall volume of the waste, and correspondingly reducing the charges for waste disposal.

The shredding apparatus of the invention is considerably less expensive than the large rotary pallet shredders, and thus can be used by companies that have a smaller volume of used pallets to be discarded.

Other objects and advantages will appear in the course of the following description.

DESCRIPTION OF THE DRAWINGS

FIG. 2 is an enlarged fragmentary vertical section showing a blade assembly;

FIG. 3 is a view taken along line 3—3 of FIG. 4;

FIG. 4 is an elevational view of the chute;

FIG. 5 is a view taken along line 5—5 of FIG. 2;

FIG. 6 is a plan view of a blade assembly;

FIG. 8 is an enlarged fragmentary vertical section showing the attachment of the pallet step; and FIG. 9 is a section taken along line 9—9 of FIG. 8.

DESCRIPTION OF THE ILLUSTRATED EMBODIMENT

Figure 1:
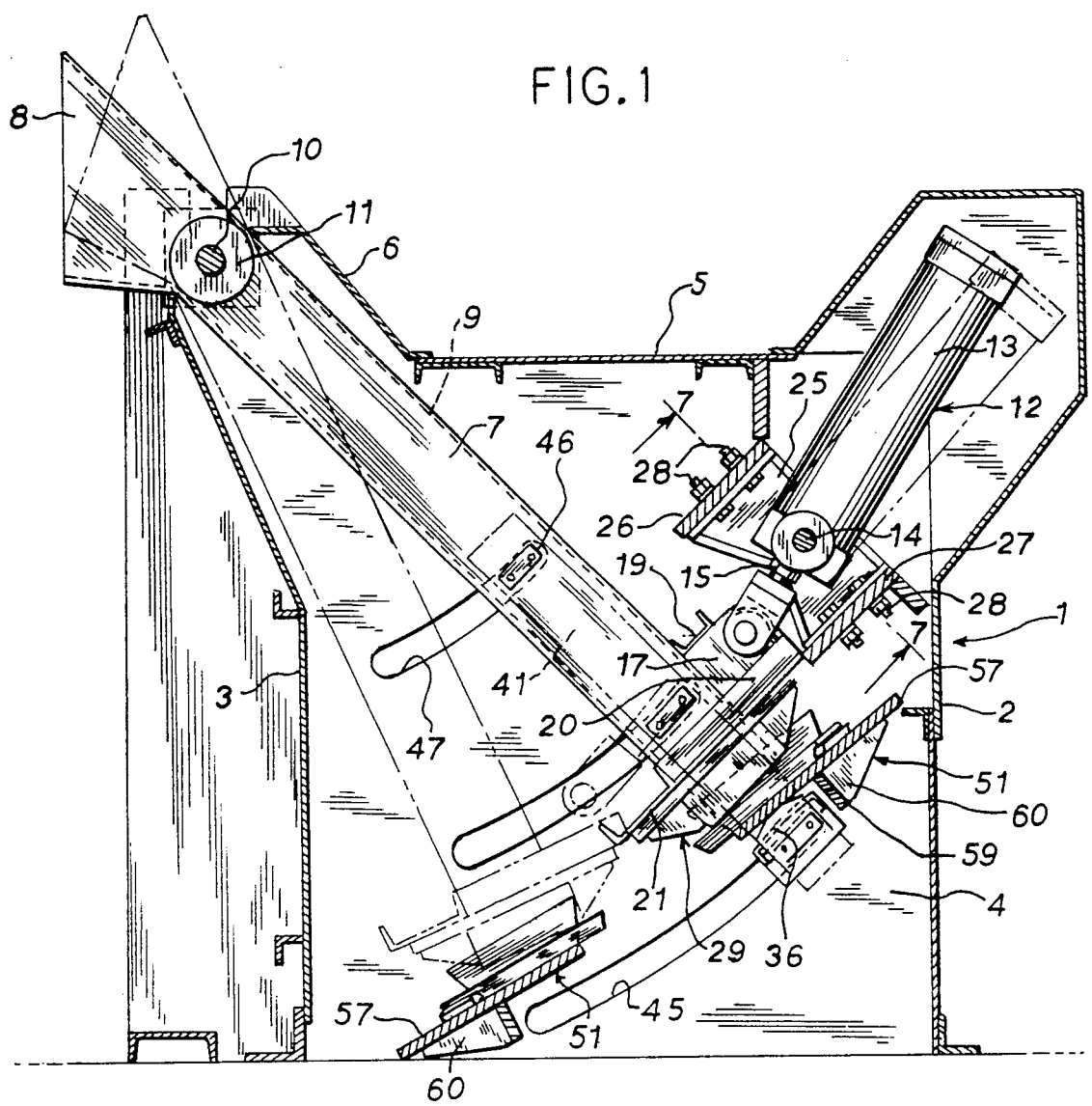
FIG. 1 is a vertical section of the shredding apparatus of the invention.

The drawings illustrate a shredding or a comminuting apparatus which has particular application for shredding wood pallets. The apparatus includes a housing 1, including a front wall 2, a rear wall 3 and a pair of side walls 4 which connect the front wall and rear wall. The upper end of the housing is enclosed by a top wall 5 while the lower end of the housing is open and can communicate with a collection site adapted to receive the shredded fragments of the pallet.

The upper rear portion of housing 1 is formed with an extension 6 having an open upper end, and a chute 7 is mounted within housing 1. The enlarged upper end 8 of the chute, which serves as a feed hopper 8, extends upwardly through the extension 6, as shown in FIG. 1. One or more wood pallets 9 are fed into the chute 7 through the upper hopper end 8.

Chute 7 is mounted for oscillating movement within housing 1 and in this regard, stub shafts 10 project laterally outward from opposite sides of chute 7, and are journaled within bearing assemblies 11 mounted on side walls 4 of housing 1.

Chute 7 is moved in an oscillatory path of travel by a pair of hydraulic cylinder units 12. Each cylinder unit 12 includes a hydraulic cylinder 13 which is pivoted to housing 1 by trunnions 14. A piston rod 15 is slidable in each cylinder 13 and the outer end of the piston rod carries a clevis 16 which is pivotally connected to a lug 17 secured to the lower end of chute 7. As seen in FIG. 3, lugs 17 are located the sides of chute 7.

To reinforce the lower end of chute 7, a lower channel 18 is welded to one face of the chute 7, and the lower edges of lugs 17 are secured to channel 18. In addition, an upper channel 19 is welded to the upper edges of lugs 17, as well as to the face of chute 7. An angle 20 is welded to the end of chute 7, as well as to the corresponding end of the lower channel 18, as shown in FIG. 3.

Similarly, a channel 21 is secured to the opposite face of chute 7 and a series of gussets 22 are welded between channel 1 and the face of chute 7, as shown in FIGS. 2 and 3.

Figure 7:
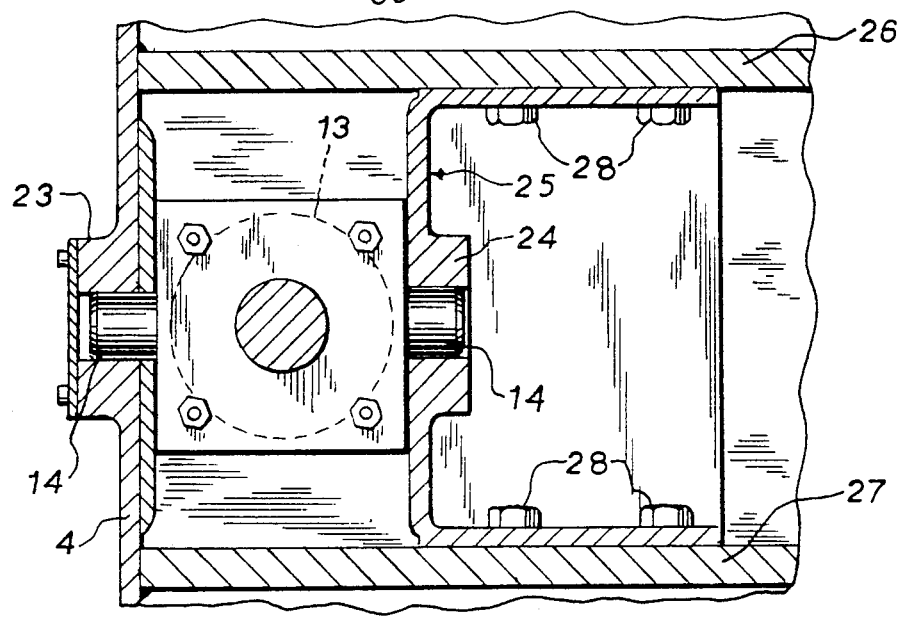
FIG. 7 is a section taken along line 7—7 of FIG. 1.

As previously noted, cylinders 13 of cylinder units 12 are mounted for pivotal movement to housing 1 through trunnions 14. In this regard, the outboard trunnion 14 of each cylinder 13 is journaled within a bearing boss 23 on the side wall 4 of the housing 1 while the inboard trunnion 14 of each cylinder is journaled within a bearing boss 24 mounted in a box-shaped housing 25. Each housing 25 is mounted between an upper plate 26 and a lower plate 27 that project inwardly from the respective side wall 4, as shown in FIGS. 1 and 7. Bolts 28 connect the plates 26 and 27 to the housing 25. With this construction, each cylinder 13 can pivot relative to housing 1 as the piston rod 15 is extended and contracted.

Connected to the lower end of chute 7 is a shear collar assembly 29 composed of a base plate 30 that is connected to the channels 18 and 21 by bolts 31. A pair of parallel plates 32 extend downwardly in spaced relation from base plate 30, as seen in FIG. 5, and the ends of plates 32 are connected by end plates 33. Gussets 34 connect the base plate 30 to plates 32. As shown in FIG. 5, each plate 32 is formed with a series of parallel slots 35 which receive splitter blades as will be hereinafter described.

The lower end of the lowermost pallet 9 in chute 7 projects outwardly of the chute, and is adapted to engage a pallet stop 36 which is carried by the chute, and is spaced from the lower end of the chute. As best seen in FIG. 9, pallet stop 36 includes an upper channel 37 formed of an abrasion resistant steel, and a lower channel 38 which supports the upper channel 37. Spacers 39 and end bars 40 are secured to the ends of the channels 37 and 38, and a channel-shaped arm 41, which is located outside of the respective side wall 4, is connected to each end bar 40 by a pair of bolts 42. As shown in FIG. 8, a pair of bolts 42 extend through openings in shim block 43, and are threaded in holes 44 in end bar 40. Holes 44 provide an adjustment for the position of the pallet stop 36, thus determining the amount of the pallet which projects from the lower end of the chute, and thereby controlling the depth of cut or shredding.

As illustrated in FIG. 8, the shim blocks 43 project through arcuate slots 45 in the side walls 4 so that chute 7 and arms 41 can oscillate relative to housing 1.

The upper end of each arm 41 is connected through a block 46 to the upper end of chute 7. Blocks 46 are adapted to travel within slots 47 as the chute 7 oscillates. Similarly, the central portion of each arm 41 is connected through a block 48 to the corresponding side of chute 7, and blocks 48 travel within arcuate slots 49 in side walls 4 as the chute is oscillated.

As chute 7 oscillates, the projecting end of the pallet 9 engages a pair of spaced blade assemblies 51 which are secured to housing 1 to thereby shred the projecting end of the pallet.

Each blade assembly 51 includes a generally flat shear blade 52, and the opposite edges 53 are generally V-shaped in configuration, and include a central outwardly projecting apex 54, as illustrated in FIG. 6. The apex 54 is adapted to initially engage the pallet as the chute and pallet is moved in a stroke of movement toward the respective blade assembly. As best shown in FIG. 2, each edge 53 of shear blade 52 is undercut to provide the edge with a relatively sharp configuration. If one blade edge 53 becomes worn, the blade 52 can be reversed in position.

Extending upwardly from the blade 52 of each blade assembly 51 are parallel spaced splitter blades 55. Splitter blades 55 extend substantially the whole width of blade 52, as shown in FIG. 6, and are adapted to engage the lower end portion of the pallet 9, above that portion being sheared by the blade 52, to split the wood so that in the next stroke of the chute, the split end of the pallet can be more readily sheared by the blade 52. Blade 55 provides a cross cut in the pallet wood. The next stroke will then allow shear blade 52 to cut the pallet wood into pieces. Shear blade 52 and blade 55 provide bi-direction cutting in a single stroke. As the chute oscillates, the splitter blades 55 will pass within the slots 35 of plates 32 in shear collar assembly 29. As shown in FIG. 2, the splitter blades 55 have forward and rear edges 56 which are slightly undercut.

Each blade 52 of blade assembly 51 is mounted on a bed plate 57, and is connected to the bed plate by a series of screws 58. A vertical plate 59 extends downwardly from the bed plate 57, and is connected to the bed plate by a series of gussets 60. Mounted on the upper surface of plate 57 is a key stock 61 which serves as a backstop for the blade 52 to resist the thrust as the pallet engages the blade.

In operation, the chute 7 is moved in its oscillatory path of movement by the hydraulic cylinder units 12 and, as the chute approaches the end of its stroke, the projecting end of the pallet, which is supported on the pallet stop 36, will engage the shear blade 52, shearing the lower end of the pallet away. Simultaneously, the portion of the pallet above that which is being sheared by blade 52 will be split by the splitter blades 55. At the end of the stroke of the chute, as shown in FIG. 1, the pallet stop 36 will be located directly beneath the blades 52 and 55. As the end of the pallet is sheared away, the fragments will fall downwardly through the lower open end of the housing to a collection site. As the chute 7 moves in the opposite stroke of movement, the lowermost portion of the pallet that previously was split by blades 55 will engage the shear blade 52 of the other blade assembly to shear or fragmentize the previously split end. In many installations, the shredding apparatus will be mounted directly above a compactor so that the sheared fragments will fall directly into the compactor.

With this construction, using the pair of blade assemblies 51, the pallet will be shredded during both strokes of movement of the chute, thus increasing the speed of the shredding operation.

Various modes of carrying out the invention are contemplated as being within the scope of the following claims, particularly pointing out and distinctly claiming the subject matter which is regarded as the invention.

We claim:

1. A shredding apparatus for shredding articles, comprising a supporting structure, a chute having an open upper end to receive articles to be shredded and having an open lower end, pivot means for mounting the chute for movement in a reciprocating path, drive means operably connected to the chute for moving the chute in said path of movement, a stop carried by to the chute and movable with the chute, said stop spaced from the lower end of the chute and disposed to be engaged by the projecting lower end of an article, and fixed blade means secured to said supporting structure and disposed to be engaged by the projecting end of the article as the chute is moved to thereby shred said article.

2. The apparatus of claim 1, wherein said chute is movable in said path between a first position and a second position, the lower end of said chute being aligned with said blade means and said stop being located beneath said blade means when said chute is in said first position.

3. The apparatus of claim 2, wherein said blade means includes a shear blade having an edge disposed to be engaged by the projecting end of said article, said edge being V-shaped in planar configuration.

4. The apparatus of claim 1, and including a pair of said blade means mounted in spaced relation on said supporting structure, the lower end of the chute disposed in alignment with a first of said blade means when said chute is in said first position, and the lower end of the chute being aligned with a second of said blade means when said chute is in said second position.

5. The apparatus of claim 1, wherein said blade means includes a shear blade disposed generally parallel to said path of movement, and a plurality of splitter blades extending upwardly in spaced relation from said shear blade.

6. The apparatus of claim 1, and including adjusting means for adjusting the position of the stop relative to the lower end of the chute to determine the depth of cut of said blade means.

7. The apparatus of claim 1 and including an arm connected to each side of said chute, each arm having a lower end projecting beyond the lower end of said chute, said stop being connected to the lower ends of said arms.

8. An apparatus for shredding wood pallets, comprising a supporting structure, a chute having an open end to receive a pallet and having an open lower end, mounting means for mounting the chute in an oscillating path of movement from a first position to a second position, drive means for moving said chute in said oscillating path, a pallet stop connected to the chute and spaced from the lower end of the chute and disposed to be engaged by the lower end of a pallet projecting from the lower end of the chute, a pair of fixed blade assemblies, secured in spaced relation to said supporting structure, one of said blade assemblies being aligned with the lower end of the chute when said chute is in the first position, and the other of said blade assemblies being aligned with the lower end of the chute when said chute is in said second position, each blade assembly including a shear blade disposed to engage the projecting end of the chute as the chute is moved between said first and second positions to thereby shred the pallet into fragments, and a disposal site located between said blade assemblies to receive said fragments.

9. The apparatus of claim 8, wherein said pallet stop is located beneath said first blade assembly when said chute is in said first position, and said pallet stop is located beneath said second blade assembly when said chute is in said second position.

10. The apparatus of claim 8, wherein said drive means comprises a hydraulic cylinder unit.

11. The apparatus of claim 8, wherein both positions of said chute are at an acute angle to the vertical.

12. The apparatus of claim 8, wherein each blade assembly includes a plurality of splitter blades projecting upwardly in spaced relation from said shear blade.

13. The apparatus of claim 8, wherein the lower end of said chute is provided with a plurality of spaced slots to receive said splitter blades.

14. The apparatus of claim 8, wherein said apparatus includes an arm connected to each side of said chute, each arm having a lower end projecting beyond the lower end of said chute, said pallet stop being connected to the lower ends of said arms.

15. The apparatus of claim 14 and including adjusting means for adjusting the position of said pallet stop relative to the lower end of the chute to thereby adjust the cut of said shear blade.

16. The apparatus of claim 12, wherein said shear blade is disposed generally parallel to said path of movement and said splitter blades are normal to said shear blade.

17. The apparatus of claim 8, wherein each shear blade has a pair of opposed edges, each edge being generally V-shape in planar configuration with the V's facing in opposite directions, said shear blade being reversible in said blade assembly.

18. A shredding apparatus for shredding articles, comprising a supporting structure, a chute having an open upper end to receive articles to be shredded and having an open lower end, means for mounting the chute for movement in an oscillatory path, drive means operably connected to the chute for moving the chute in said path, a fixed shear blade secured to said supporting structure and disposed to be engaged by the projecting end of the article as the chute is moved in said path, and at least one splitter blade projecting outwardly from the shear blade and disposed at an angle to said shear blade.

19. The apparatus of claim 18, and including a plurality of said splitter blades disposed in spaced relation on said shear blade.

20. The apparatus of claim 19, wherein said splitter blades are disposed generally normal to said shear blade.

* * * * *

UNITED STATES PATENT AND TRADEMARK OFFICE
CERTIFICATE OF CORRECTION

PATENT NO. : 5,263,654
DATED : November 23, 1993
INVENTOR(S) : MICHAEL J. YOUNG

It is certified that error appears in the above-indentified patent and that said Letters Patent is hereby corrected as shown below:

Col. 5, Line 3, CLAIM 1, After "by" cancel "to"

Signed and Sealed this

Thirtieth Day of August, 1994

Attest:

BRUCE LEHMAN

Attesting Officer    Commissioner of Patents and Trademarks